R. B. TAYLOR.

CLAMPS FOR SHINGLE-PACKERS.

No. 6.741. Reissued Nov. 16, 1875.

Witnesses:
Jno. W. Hawley.
O. H. Adix,

Inventor:
Robert B. Taylor,
By G. H. Chapin, Atty

N. PETERS, PHOTO-LITHOGRAPHER, WASHINGTON, D. C.

UNITED STATES PATENT OFFICE.

ROBERT B. TAYLOR, OF OCONTO, WISCONSIN.

IMPROVEMENT IN CLAMPS FOR SHINGLE-PACKERS.

Specification forming part of Letters Patent No. 98,123, dated December 21, 1869; reissue No. 6,741, dated November 16, 1875; application filed July 22, 1875.

DIVISION A.

*To all whom it may concern:*

Be it known that I, ROBERT B. TAYLOR, of Oconto, in the county of Oconto, in the State of Wisconsin, have invented a new and useful Improvement in Clamps for Shingle-Packers, of which the following is a specification:

The object of the present invention is to provide more convenient means for clamping bunches of shingles together, and, at the same time, by the use of such means as will admit of the strap-iron fastening being secured to the bands of the bunch while the clamps are in position. This I accomplish by the peculiar construction of the clamps, which are vertically slotted, so as to expose the ends of the bands for fastening the straps. Dogs or lugs projecting inward from the vertical parts of the clamps grasp the bands close to their ends, and compress them at those points, so that there is no slack after bunching, as is hereinafter fully described and shown.

Figure 1:
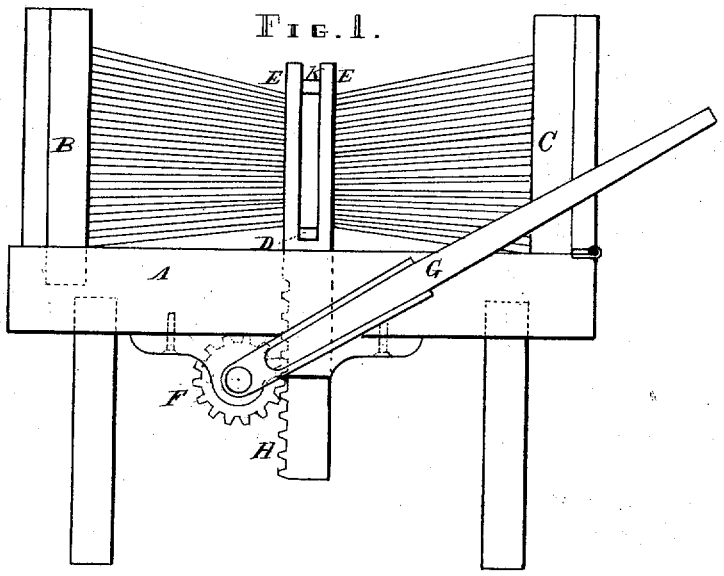
Figure 2:
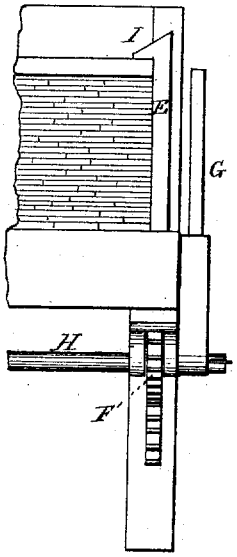
Figure 3:
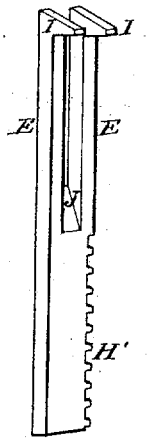

In the drawings, Figure 1 is an elevation of a shingle-packer provided with my improved clamps; Fig. 2, a semi-transverse section of the same; Fig. 3, a perspective representation of one of the clamps removed from the machine.

E E represent the two prongs of one of my improved clamps, which terminate at their lower ends in a solid shank, H′, and at their upper ends in dogs or lugs I I.

In practice the clamp is to be made of iron, and its shank is to pass through the bed A of the packer, and to be operated by a pinion and lever, as represented in the drawing.

The space J between the clamps E must be as great or greater than the width of the strap-iron with which the bands K D are fastened.

The shingles are packed in the frame or guides C B, so as to bear on the lower band D, as shown, the fastening strap-iron having been previously fastened to the lower band. The upper band K having been placed on the bunch, the clamps E are brought down by pinion and lever G, so as to engage the dogs or lugs I I with the ends of the band, and force the latter down so far as necessary to press the shingle bunch. After this, and while the ends of band K are yet held down, the strap-iron fastening is brought up between the clamps E, bent over the end of the band, and fastened with nails in the ordinary manner.

The lugs I bearing directly on the ends of the bands, the latter can have no apparent slack from the bunch when the clamps are removed, as is the case where clamps bear on the bands some little distance from their ends.

I claim and desire to secure by Letters Patent—

In a shingle-packer, the clamps consisting of the shanks H′, prongs E, and dogs or lugs I I, arranged to be operated as and for the purpose set forth.

ROBERT B. TAYLOR.

Witnesses:

G. L. CHAPIN,

O. H. ADIX.